United States Patent
Tirkkonen

Patent Number: 6,029,567
Date of Patent: Feb. 29, 2000

[54] MANUFACTURED ARTICLE FOR PRODUCING FOOD-CURING SMOKE

[75] Inventor: Tapani Tirkkonen, Kortteinen, Finland

[73] Assignee: Tapani Tirkkonen Oy, Kaavi, Finland

[21] Appl. No.: 08/985,803

[22] Filed: Dec. 5, 1997

Related U.S. Application Data

[63] Continuation of application No. PCT/FI96/00308, May 30, 1996.

[30] Foreign Application Priority Data

Jun. 6, 1995 [FI] Finland ............................ 952755

[51] Int. Cl.⁷ ............................................. A23B 4/052
[52] U.S. Cl. ..................... 99/482; 206/524.6; 239/136
[58] Field of Search ................ 99/482, 467, 483, 99/399; 206/524.6, 524.4, 525; 239/136

[56] References Cited

U.S. PATENT DOCUMENTS

| | | | |
|---|---|---|---|
| 2,967,023 | 1/1961 | Huckabee | 99/482 X |
| 3,347,148 | 10/1967 | Williams | 99/482 |
| 4,779,525 | 10/1988 | Gaines | 99/482 |
| 5,048,406 | 9/1991 | Cofer | 99/482 |
| 5,193,445 | 3/1993 | Ferguson | 99/482 |
| 5,301,606 | 4/1994 | Ferguson | 99/482 |

FOREIGN PATENT DOCUMENTS

| | | | |
|---|---|---|---|
| 456 926 | 11/1991 | European Pat. Off. | 99/482 |
| 373 486 | 9/1968 | Sweden . | |

OTHER PUBLICATIONS

Derwent's Abstract, No. 93–165249/20 week 9320, Abstract of Su, 1708238 (marpotrebsoyuz repair assembly combine) Jan. 30, 1992.

*Primary Examiner*—Reginald L. Alexander
*Attorney, Agent, or Firm*—Pillsbury Madison & Sutro LLP

[57] ABSTRACT

The present invention concerns an article for releasing smoke in conjunction with preparation of smoked food, the article comprising an outer shell (1) having at least one hole (2) made thereto, and a material (3) with heat-reacting and smoke-generating properties (3) placed inside the outer shell. According to the invention the article incorporates a heat-generating material (4) placed in the immediate vicinity of the smoke-releasing material (3) for heating the smoke-releasing material.

4 Claims, 2 Drawing Sheets

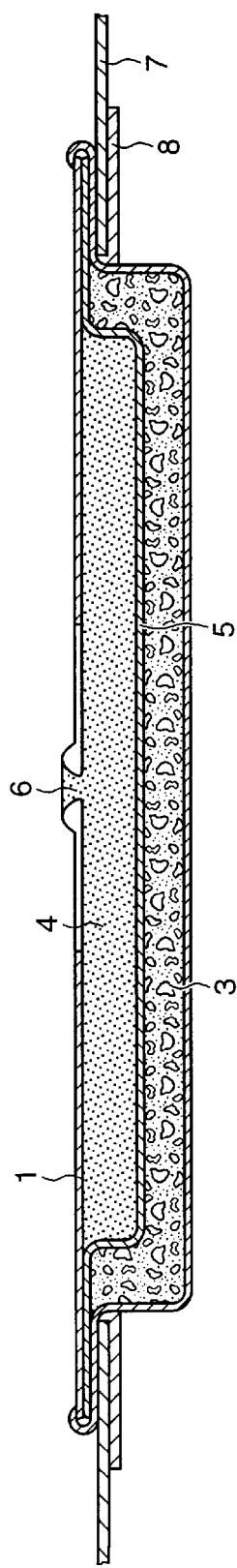

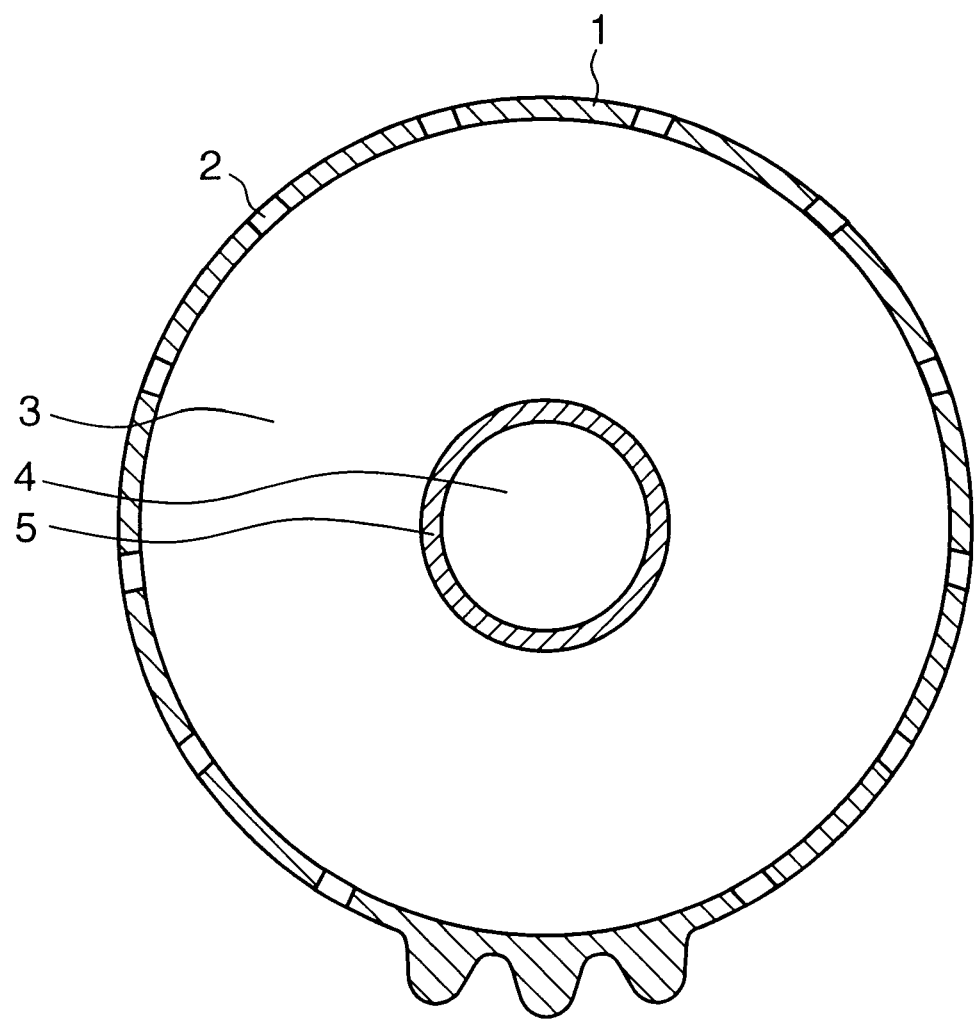

MANUFACTURED ARTICLE FOR PRODUCING FOOD-CURING SMOKE

This is a Continuation of International Appln. No. PCT/FI/9600308 filed May 30, 1996 which designated the U.S.

The present invention relates to an article for producing smoke in conjunction with the preparation of smoked food, said article comprising an outer shell having at least one hole made thereto, and a material with heat-reacting and smoke-generating properties placed inside said outer shell.

In the preparation of foods, smoking of the food is a common method involving the use of smoke in order to flavour the food and give the food a coloured surface. Conventionally, the smoke-releasing material is placed with the food in an oven, smoking box, smoking bag or similar space, and the ambient temperature is elevated high enough to cause the smoke-generating material, typically wood, to smoulder and thus to release smoke. In certain applications, the smoke-releasing material is packed in a separate enclosure or similar housing, which is then placed in the same space with the food to be cured. By elevating the temperature in the confined space high enough to heat the packed smoke-releasing material to its smouldering temperature, smoke will be released.

When using wood as the smoke-releasing material, a temperature of slightly below 300° C. is required to make the wood hot enough to release smoke. In fact, such a high temperature is not generally necessary to prepare and cure foods, but instead, a much lower temperature is sufficient.

It is an object of the present invention to provide a smoke-releasing consumer article not requiring heating of the smoke-releasing article and the food to be smoked to an elevated temperature. It is a further object of the invention to provide a smoke-releasing article having a simple structure and easy use.

The goal of the invention is achieved by virtue of an article characterized by what is stated in the annexed claims.

The article according to the invention comprises a heat-generating material placed in the immediate vicinity of a smoke-releasing material for heating said smoke-releasing material. When the heat-generating material begins to heat up, the article with the smoke-releasing material proper contained therein will also be heated even without resorting to an external source of heat. Such an article is most suitable for a variety of applications. It can be used for smoking food at any desired temperature, e.g., at temperatures below 200° C. in conjunction with curing the food. Being a self-contained article, it can be placed with the food in, e.g., an oven, pot, roasting bag or similar article of food preparation.

The heat-generating material or a combination thereof can be selected from the group of pyrotechnical materials conventionally used for such a purpose. The material may be a combustible material, or alternatively, formed by one or a greater number of chemical compounds that is/are capable of reacting chemically at a certain activation temperature so as to release heat. The amount of smoke released may be controlled by combining a certain amount of the heat-generating material with a certain amount of the smoke-releasing material. Conventional aroma ingredients and/or aromatic smoke releasing substances such as sugar or spices and the like can be used as the binder of the smoke-releasing material.

The outer surface of the article shell may be shaped differently for various applications and it may be creased or provided with bumps to keep the surface cool. In some embodiments of the invention, the outer surface may be formed by a meshed structure such as a metallic net.

In a preferred embodiment of the invention, the heat-generating material is placed at least partially inside the smoke-releasing material. Thus, the heat is efficiently transferred to the smoke-releasing material.

In a preferred further embodiment of the invention, into the article is adapted at least one shell housing the heat-generating material. Such a shell made from, e.g., thin metal heats up quickly and transfers heat efficiently from the heat-generating material to the enclosing smoke-releasing material. Additionally, a metallic shell stays hot relatively long, whereby the smoke-releasing material has time to heat up and release a sufficient amount of smoke. The shell is usually made hermetic, and in the case that the heat-generating material enclosed by the shell needs oxygen for generating the heat, also the required amount of oxygen must be contained inside the shell. Such a hermetic structure has the benefit that no gases can escape therefrom. Alternatively, the shell may be made from other material than a metal, or instead of a hermetic shell, the enclosing structure may be a net made from metal or other suitable material.

In another preferred embodiment of the invention, the heat-generating material undergoes a spontaneous exothermic reaction starting at ambient temperature of 130° C. or higher. Then, the user of the article need not bother more than placing the article in the immediate vicinity of the foodstuff to be smoked and then heat the foodstuff with the article above 130° C. Also in other embodiments of the invention, the heat-generating material can be selected from the group of materials undergoing exothermic reaction when heated above a certain temperature.

In another further embodiment of the invention, into the heat-generating material is inserted a fuze element adapted to trigger said exothermic reaction of the heat-generating material. Then, the heat-generating material can be employed at a low or preset temperature. Such a fuze element may be a conventional ignitor based on, under mechanical actuation, launching a spark or some type of chemical reaction that initiates the exothermic reaction of the heat-generating material.

In the following, the invention is explained in greater detail with reference to the annexed drawings, in which FIG. 1 is a cross-sectional side view of an embodiment of the article according to the invention; and FIG. 2 is a cross-sectional side view of another embodiment of the article according to the invention.

Referring to FIG. 1, the embodiment of the article according to the invention comprises two compartments into one of which is placed a quantity of heat-generating material 4, and into the other, another quantity of smoke-releasing material 3. The compartments are housed inside an enclosing shell 1, and between the compartments is adapted an intermediate wall or shell 5. The article is designed into an enclosed package structure. Furthermore, the article incorporates a conventional fuze element 6 located at the mid-point of the article outer surface and inserted into a hole of the package extending from the outer surface into the center of the package. The fuze element is thus adapted to ignite the heat-generating material. The shells are made from a material serving in the above-described manner the function of the article, and at least a portion of the shells may be made from a combustible or smoke-releasing material. Additionally, the article is provided with a support 7, made from cardboard or other suitable material, and a mounting element such as a mounting ring 8 for fixing the article to other structures. With the help of the support, the article may be hand-held during its ignition step and even during the smoke-releasing phase. To use the article, it will be placed in an oven or similar space, and the heat of the oven triggers the fuze element. Alternatively, the fuze element of the article may be ignited with the help of an igniting means such as a match, and the article is then placed in the immediate vicinity of the food to be smoked. The smoke emitted by the article can escape from the article via at least one hole made to the top and/or bottom of the article, or alternatively, the top of the article can be made from a smoke-releasing material.

Now referring to FIG. 2, the embodiment shown therein is shaped spherical. The design comprises an outer shell 1, a quantity of smoke-releasing material 3 and of heat-generating material 4, the latter being enclosed by a metallic inner shell 5. The surface of the outer shell is pierced by a plurality of holes 2, and the smoke-releasing material is located enclosed by the outer shell. The inner shell 5 is adapted to the center of article structure. The smoke-releasing material in the article according to the invention is wood, advantageously sawdust or similar chipped material. Depending on the application, sugar and/or spices may be added to the wood material.

In a third embodiment of the invention, the article may be shaped as a dish. Then, the food to be smoked can be placed onto the dish, and the emitted smoke is released onto or about the food from, e.g., holes made to the upper surface of the dish. An alternative embodiment comprises a cover-shaped article, whereby the smoke-releasing material of the article emits smoke from above the food.

The above-described preferred embodiments must not be understood to limit the applications of the invention, but rather, it can be varied within the scope and spirit of the annexed claims.

It is claimed:

1. An article for releasing smoke in conjunction with preparation of smoked food, said article comprising:

an outer shell having at least one hole, a material with heat-reacting and smoke-generating properties placed inside said outer shell, and a heat-generating material placed in the immediate vicinity of said smoke-releasing material for heating said smoke-releasing material, wherein inside said outer shell is at least one inner shell into which said heat-generating material is placed, and wherein the article incorporates a fuze element which is placed in conjunction with said heat-releasing material and is adapted to initiate the exothermic reaction of said heat-generating material.

2. An article as defined in claim 1, wherein said heat-generating material undergoes a spontaneous exothermic reaction when its ambient temperature exceeds 130° C.

3. An article as defined in claim 1, wherein the inner shell is made from metal.

4. An article for releasing smoke in conjunction with preparation of smoked food, said article comprising:

an outer shell having at least one hole, a material with heat-reacting and smoke-generating properties placed inside said outer shell, and a heat-generating material placed in the immediate vicinity of said smoke-releasing material for heating said smoke-releasing material, wherein inside said outer shell is at least one inner shell into which said heat-generating material is placed, and, wherein said heat-generating material undergoes a spontaneous exothermic reaction when its ambient temperature exceeds 130° C., and wherein the article incorporates a fuze element which is placed in conjunction with said heat-releasing material and is adapted to initiate the exothermic reaction of said heat-generating material.

* * * * *